3,068,401
FOCUSED WELL LOGGING SYSTEMS
Hermann Janssen, Kiel, Germany, assignor, by mesne assignments, to PGAC Development Company, Houston, Tex., a corporation of Texas
Filed Oct. 23, 1958, Ser. No. 769,239
Claims priority, application Germany Nov. 2, 1957
13 Claims. (Cl. 324—1)

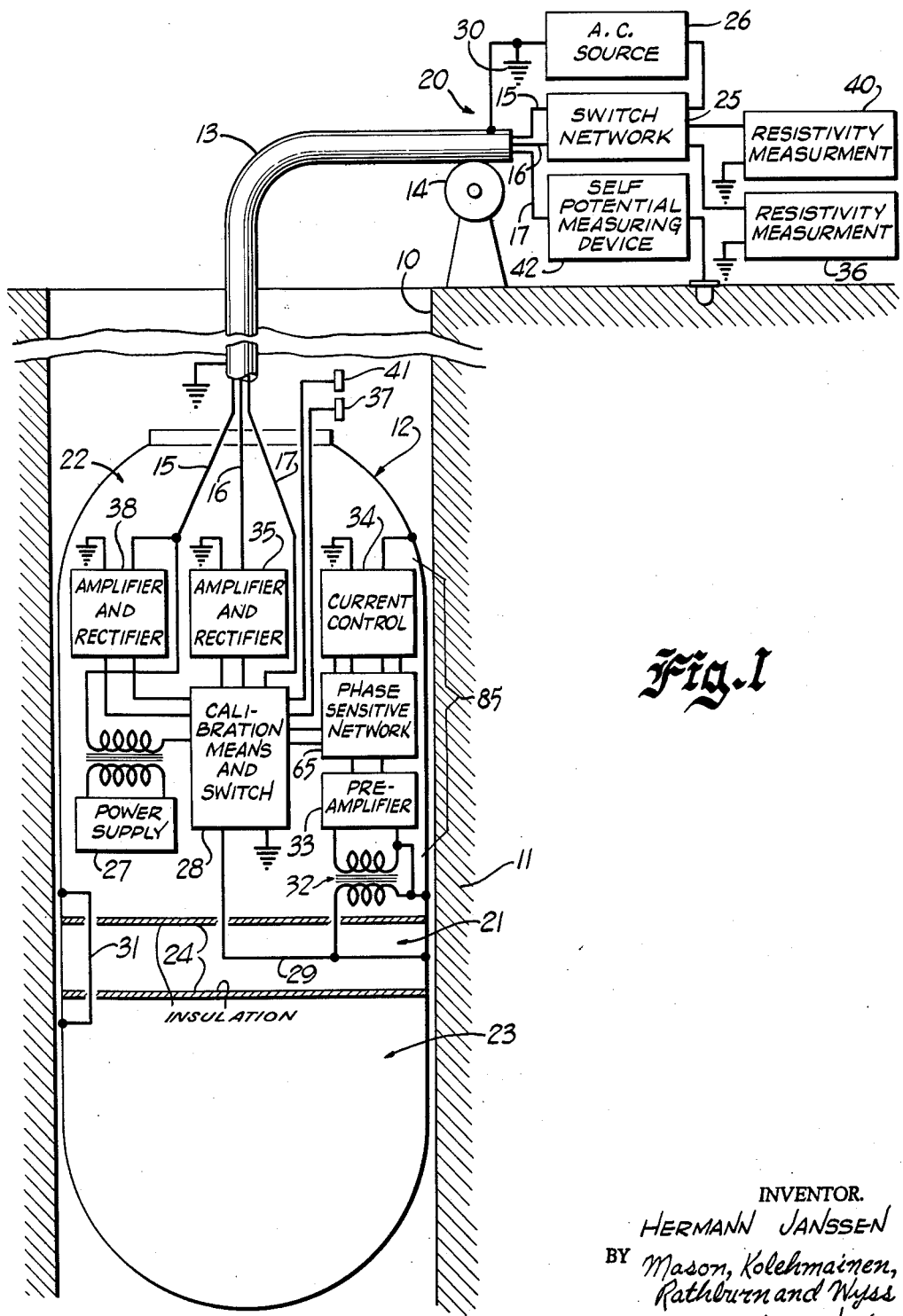

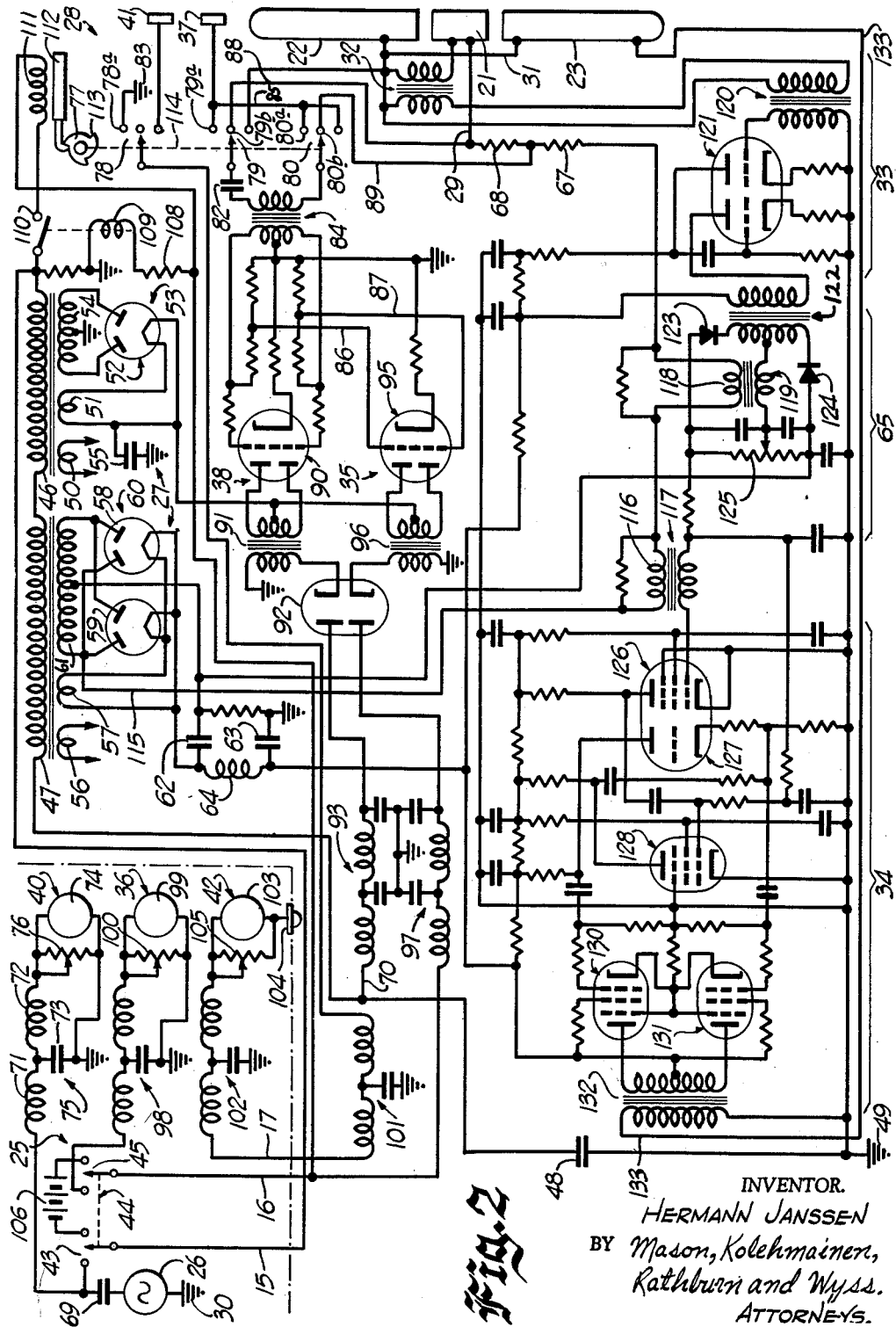

The present invention relates generally to electrical well logging of formations adjacent a borehole and, more particularly, to improvements in electrical well logging systems of the type in which an electrical survey current is forced into the formations in the form of a thin sheet or disk extending perpendicular to the borehole in order to facilitate the production of resistivity measurements which are especially useful in locating and identifying relatively thin strata in the formations. More specifically, the present invention is concerned with certain improvements in well logging systems of the type disclosed in applicant's copending application Serial No. 648,892, filed March 27, 1957 and assigned to the same assignee as the present invention, and now Patent No. 2,967,272.

In the systems of the type referred to, electrodes which are conventionally termed guard or screen electrodes, are disposed symmetrically above and below one of more current emitting electrodes and the potential of the screen electrodes is controlled in order to create electric fields which block the flow of current longitudinally of the borehole, thereby forcing this current to flow laterally into the formations in a direction extending generally perpendicular to the borehole. A resistivity indication is then obtained by measuring the potential difference existing between a point located in the vicinity of the point or points of current emission and a reference point which is infinitely remote therefrom. Such a measurement may be made either by sampling directly the potential difference existing between the current electrode and the remote point or by measuring the difference of potential between the remote point and one or more potential or probe electrodes located adjacent the current electrode. In either case a log is made of the apparent resistivities of the formations as a function of borehole depth to produce a curve in which an attempt is made to depict differences in resistance of the formations lying along the borehole.

Obviously, in order to portray accurately the exact bounds of very thin strata the measuring equipment must respond very rapidly to changes in resistivity of the formations and, at the same time, the potential of the screen electrodes must be adjusted very quickly to compensate for the abrupt changes in formation resistance. One of the principal disadvantages of the prior art arrangements flows from their inability to alter the potential of the guard or screen electrodes sufficiently rapidly to permit clear differentiation between extremely thin layers and, as a consequence, the existence of many such layers has been entirely overlooked prior to the present invention.

In certain systems proposed prior to the present invention, the potential of the screen electrodes has been controlled by electromechanical devices such as servomechanisms but these devices are notoriously slow in responding to quick changes in the input signal and, hence, are susceptible to the disadvantages described above. To attain the almost instantaneous response required for proper operation, a fully electronic control for the screen potential is necessary but such a control must possess a number of characteristics which are not present in arrangements proposed prior to the present invention. In the application Serial No. 648,892 referred to above, for example, an arrangement is disclosed where the screen potential is controlled by amplifier circuits receiving their input signal from a transformer having a low impedance primary winding connected between the measuring or current electrode and the screen electrodes. The amplifiers respond to the input signals by controlling the potential of the screen electrodes in an attempt to maintain the difference of potential between the current and screen electrodes constant and nearly zero. In systems of this type and in other prior art arrangements operating upon the same principle, the input signal to the amplifiers must be very small in order to avoid distortion of the field around the measuring electrode and, as a consequence, the amplification factor or gain of the amplifiers must be very high in order to effect the proper regulation of the screen potential over the widely varying formation resistances likely to be encountered. Since a direct connection is provided between the output of the amplifiers and the screen electrodes, a feedback loop is formed including the amplifier inlet resistance and the resistance of the earth formations and this loop functions to supply a feedback signal to the input of the amplifiers having an amplitude that increases as the earth resistances decrease. Thus, for small resistances, a relatively high amplitude feedback signal is developed which is likely to drive the amplifiers into oscillation particularly when high gain amplifiers are employed as is required for the small input signals usually available. Such arrangements are, therefore, entirely adequate for measuring high earth resistances but, in order to measure small resistances, the amplification or gain must be reduced.

A principal object of the present invention is to provide a well logging apparatus of the character described which does not possess the aforementioned disadvantages.

Another object of the invention is to provide a well logging system of the focused type which develops much more accurate results than other systems heretofore proposed.

A further object of the invention is to provide a highly accurate well logging system of the focus type which develops a logging curve characterized by a clear definition of very thin layers impossible to recognize on the curves produced by similar systems employed in the past.

It is also an object of the invention to provide a new and improved fully electronic regulator for use in controlling the potential of the screen or guard electrodes employed in well logging systems of the type described above.

It is likewise an object of the invention to provide an electronic regulator for use in controlling the potential of the screen electrodes wherein the regulator is not susceptible to the aforementioned disadvantages resulting from overdrive of its input circuits by the feedback current flowing when the earth resistances being measured are relatively small.

The invention, both as to its organization and method of operation, together with further objects and advantages thereof will best be understood with reference to the specification taken in conjunction with the accompanying drawings wherein:

FIG. 1 diagrammatically represents a well logging system characterized by the features of the present invention; and FIG. 2 is a schematic diagram which shows in some detail the circuits represented in block form in FIG. 1.

Referring now to the drawings, the present invention is there illustrated as embodied in an apparatus for electrically logging a well or borehole 10 in order to determine the characteristics of earth formations 11 penetrated or traversed by the borehole. It will be understood that the borehole 10 may contain drilling fluid with mud suspended therein which generally remains in the hole after the removal of the drilling equipment although such fluid has not been illustrated in the drawings.

Investigation apparatus or downhole equipment, indicated generally by the reference character 12, is carried upon the lower end of a multiconductor cable 13 for movement up or down within the borehole 10. To effect the raising and lowering of the apparatus 12, the cable 13 is trained over a motor driven sheave 14 or the like at the earth's surface and may be wound upon a suitable take-up reel (not shown) in conventional manner. In the form of the invention illustrated, the cable 13 contains three conductors 15, 16 and 17, each of which terminates at one end in the investigation apparatus 12 and at the other end is connected to surface equipment designated generally by the reference character 20.

The downhole equipment 12 comprises a housing which carries on its outer surface a current or measuring electrode 21 and a pair of elongated guard or screen electrodes 22 and 23 respectively disposed above and below the measuring electrode. The screen electrodes 22 and 23 are interconnected by conductor 31 and are electrically insulated from the measuring electrode 21 by means of suitable insulation indicated by the reference character 24. All three of the electrodes are exposed to the fluid in the borehole.

The conductor 15 is adapted to be connected at its upper end through a manually operated switch network 25 to a suitable source of alternating current 26 which applies a logging or measuring current preferably having a frequency of 400 cycles to the measuring electrode 21. The switch network 25 may be selectively rendered effective either to send the described logging current down the cable, or, alternatively, to supply a switching signal to the apparatus 12 in a manner described more fully below in order to calibrate the surface equipment 20 preparatory to the initiation of a logging operation. The source 26 is so designed that, when the switch network 25 is in its logging or operating position, a constant current is furnished to the downhole equipment 12. This current is used to drive a power supply 27 which supplies filament and B+ signals to electrical components of the subsurface equipment. The described measuring current is also delivered through a calibration and switch network or circuit 28 and through a signal connector 29 to the measuring electrode 21 from where it passes through the borehole fluid to the formations 11. The circuit for this 400 cycle measuring current is completed through a ground connection 30 at the earth's surface connected to one side of the source 26.

To obtain a resistivity measurement of the formation or stratum lying adjacent the measuring electrode 21, the difference of potential existing between the electrode 21 and a remote reference point, as, for example, the remotely positioned electrode 37 carried on the downhole apparatus at a point spaced some distance from the screen electrode 22 is applied through the calibration and switch circuit 28 to an amplifier and rectifier 38, where the signals are converted to a slowly varying D.C. signal which is passed through cable conductor 15 to the surface equipment 20. At the surface equipment the signals appearing upon conductor 15 are passed through the switch network 25 to a recording galvanometer 40 which provides a continuous indication of the magnitude of these D.C. resistivity signals as a function of borehole depth as the downhole apparatus 12 traverses the borehole.

The borehole 10 is effectively plugged electrically in order to prevent the dispersion of the measuring current along the mud column or the borehole fluid lying adjacent the borehole formations by supplying current to the screen or guard electrodes 22 and 23 of sufficient magnitude to maintain these electrodes at substantially the same potential as the measuring electrode 21. As indicated above, measuring systems of this kind exhibit a focusing effect in which the measuring current flows from the measuring electrode 21 laterally in a thin sheet or disk extending perpendicular to the borehole and having a thickness which is a function of the height of the electrode 21. This measuring current flows laterally into the borehole formations to an extent which is determined by the potential and length of the screen electrodes 22 and 23. A large difference of potential between the measuring electrode 21 and the electrically connected screen electrodes 22 and 23 would result in a change of the focusing of the measuring current and, hence, would introduce a substantial error in the determination of the true resistivity of the formation lying adjacent the electrode 21. To prevent such a potential difference, the gap between the measuring electrode 21 and the screen electrode is bridged by a transformer 32 having an extremely low primary impedance. The secondary of the transformer 32 supplies excitation signals for an electronic regulator characterized by the features of the present invention for supplying current to the screen electrodes 22 and 23. This regulator is indicated generally by the reference numeral 85 and includes a preamplifier 33, a phase sensitive network 65 and a regulated current control circuit 34.

The proportion of the screen control current to the measuring current depends upon the ratio of the specific resistivity of the stratum lying adjacent the electrode 21 to the adjoining strata lying opposite the screen electrodes 22 and 23. Specifically, the ratio of screen current to measuring current increases when a thin strata is being investigated, when the specific resistivity of the mud is relatively low or when the ratio of the specific resistivity of the investigated stratum is relatively high in comparison to the resistivity of the adjoining strata. Current ratios of the order of $10^5$ and higher are frequently obtained, and, since the available current from the current control circuit 34 is limited, the achievement of such a high proportion can be obtained only by keeping the measuring current relatively low.

Since it is impossible to obtain linear amplification over a range covering several decades or 10 to 1 ratios of input signal, the amplifier 38 may saturate when very high formation resistances are encountered. Thus, about one-tenth of the signal input to the amplifier 38 is diverted to an amplifier and rectifier circuit 35 which converts the A.C. signals to a slowly varying D.C. signal for passage through conductor 16 to the surface equipment. At the surface, the signals appearing upon the conductor 16 pass through the switch network 25 to a measuring circuit 36 where they are recorded as a function of borehole depth simultaneously with the apparent resistivity measurements provided by the measuring instrument 40. The indications provided by the device 36 may thus be used for high resistance formations while the indications provided by the device 40 may be used to determine the resistivities of the relatively low resistance formations.

Natural earth potentials are recorded simultaneously with the apparent resistivity measurements by supplying the signals picked up by a remotely positioned electrode 41 through the calibration and switch circuit 28 and through the cable conductor 17 to the surface equipment.

The differences of potential existing between electrode 41 and a ground or surface electrode are then recorded by a self potential measuring device 42 simultaneously with the signals recorded by the devices 36 and 40. The electrode 41 is preferably located at some distance from the elongated electrode 22 due to the fact that the presence of a long metallic body in the borehole adversely affects the self potential signals present in the vicinity of the long electrodes.

Referring now to FIG. 2 for a detailed description of the circuits described briefly above, it will be observed that the current developed by the source 26 passes through a condenser 69 and through section 43 of a manually operated dual section switch 44 in the network 25 to the cable conductor 15. Specifically, when the switch 44 is in its operating or logging position, the movable blade of section 43 engages the left contact and delivers current from source 26 to conductor 15. The current in conductor 15 passes through the series connected primary windings of a pair of transformers 46 and 47 and through a condenser 48 to ground as indicated at 49. The circuit is, of course, completed as mentioned above, by the ground connection 30 connected to one side of the source 26. Transformer 46 supplies filament voltage for the vacuum tubes employed in the amplifier and rectifier circuits 35, 65 and 38 and also supplies excitation voltage for that portion of the power supply 27 which develops plate voltage for these two amplifier and rectifier circuits. Transformer 47, on the other hand, supplies filament voltage for the vacuum tubes of the preamplifier 33 and the current control circuit 34 and, in addition, supplies excitation potential for that portion of the power supply 27 which develops B+ voltages for the latter circuits. Specifically, transformer 46 includes a secondary winding 50 which supplies a filament voltage for the vacuum tubes of the circuits 35 and 38, a second filament winding 51 for heating a dual diode rectifier tube 52 of a power supply 53 forming a portion of the supply 27, and a third secondary winding 54 which has its opposed ends connected to the plates of the tube 52. The A.C. signal appearing across winding 54 is, of course, full wave rectified in conventional manner to develop B+ signals for the vacuum tubes employed in the amplifier and rectifier circuits 35 and 38. This B+ voltage is filtered by a condenser 55 connected between the B+ bus conductor of the power supply 53 and ground.

In similar manner, the transformer 47 includes a filament winding 56 connected to the filaments of the vacuum tubes employed in the circuits 33 and 34, a second filament winding 57 which is connected to rectifier tubes 58 and 59 of a power supply 60 forming a part of the supply 27, and a third secondary winding 61 which provides A.C. drive for the power supply 60. The vacuum tubes 58 and 59 function as full wave rectifiers to convert the A.C. voltage appearing across secondary winding 61 to a relatively high D.C. signal which is filtered by a conventional π network filter consisting of condensers 62 and 63 and inductor 64. The output of the latter filter network serves as the plate and screen supply for the vacuum tubes of the circuits 33, 65 and 34.

The measuring electrode 21 is supplied with an essentially constant current by passing current from one end of the secondary winding 61 through conductor 115, through the primary winding 116 of an input transformer 117 for the current control circuit 34, through the primary winding 118 of a transformer 119 in the phase sensitive circuit 65 and through series connected calibration resistors 67 and 68. To effect the constant current flow, the impedance of the circuit to the measuring electrode 21 is relatively high so that changes in contact resistance of the latter electrode do not appreciably alter the magnitude of the measuring current flow. Condenser 48 serves as a ballast condenser to help maintain the current flow to the measuring electrode 21 at the desired current level.

At the same time that the 400 cycle alternating current from source 26 is flowing down the conductor 15, direct current may flow through this conductor to transmit the apparent resistivity measurements to the surface equipment. To this end, the potential difference existing between the measuring electrode 21 and the remote electrode 37 is passed through the amplifier and rectifier circuit 38, through signal connector 70 and through the cable conductor 15 to the measuring circuit 40. The input to the latter measuring circuit preferably includes a conventional T-filter 75 consisting of inductors 71 and 72 and condenser 73, the output of this filter being connected to a recording galvanometer 74. The galvanometer 74 functions to provide a continuous indication of the direct current signal appearing upon conductor 15 in order to produce a log of the apparent resistivity measurements as a function of depth. Such a log may be produced by employing the galvanometer 74 to control the deflection of a light beam impinging upon a light sensitive record medium driven in synchronism with the rotation of sheave 14 although such a medium is not shown in the drawings. A variable resistor 76 is shunted across the recording galvanometer 74 for the purpose of controlling and adjusting the magnitude of the galvanometer deflections when the galvanometer is supplied with a calibrating signal from the downhole equipment in the manner described more fully below. The filter 75, of course, prevents the A.C. current developed by the source 26 from reaching the recording galvanometer 74 and it also eliminates undesired or transient A.C. signals which may be picked up as the desired D.C. signal traverses the cable. Condenser 69 prevents the D.C. signal appearing upon conductor 15 from flowing to the A.C. source 26.

Turning now to a consideration of the manner in which the D.C. signals supplied to cable 15 are developed in the downhole equipment, it will be observed that the input to the amplifier and rectifier circuit 38 passes through the calibration and switch circuit 28. The latter circuit includes a multiple section, three position solenoid operated switch 77 which is adapted to be actuated in response to D.C. signals supplied from the network 25 through cable conductor 15 in a manner described more fully hereinafter. The switch 77 in its first position, termed an "off" position, prevents the flow of signals to the surface equipment 20, in its second position, termed a "calibrate" position, supplies D.C. signals of predetermined amplitude to the surface equipment in order to calibrate the measuring circuits and in a third position, termed the "logging" or "measuring" position, supplies self potential signals through cable conductor 17 to the measuring device 42, supplies the resistivity signals through cable conductor 15 to the recording and measuring circuit 40 and supplies a correction signal through cable conductor 16 to the measuring device 36. Specifically, the stepping switch 77 in its "off" position, that is, with the movable arms of switch sections 78, 79 and 80 in respective engagement with contacts 78a, 79a and 80a, conductor 17 is connected to ground as indicated at 83, and as a result, no signals are transmitted to the measuring circuit 42. At the same time, the primary winding of the input transformer 84 for the amplifier and rectifier circuit 38 is shorted via signal connector 85. Thus, no signals are transmitted to the surface equipment through the cable conductors 15 and 16. With the stepping switch in its second or "calibrate" position, that is, with the blades of the switch sections in engagement with the contacts designated by reference numerals suffixed with the letter "b," cable conductor 17 is confronted by an open circuit condition and the primary winding of transformer 84 is excited by the 400 cycle signal developed across resistor 68 by the flow of measuring current. Specifically, contact 79b of switch section 79 is connected to one side of resistor 68 via conductor 88 while switch section 80b is connected to the other side of the resistor 68 via conductor 89. Thus, with the stepping switch in the "calibrate" position and with the uphole switch 44 in the "operate" position, the constant current flowing to the measuring electrode 21 induces a voltage drop across resistor 68 which is applied across the primary winding of the transformer 84. As previously mentioned, the secondary winding of the transformer 84 is connected to provide drive for a conventional push-pull amplifier 90 which amplifies the A.C. input signal and supplies it through an output transformer 91 to one section of a dual diode tube or rectifier 92, where this signal is half-wave rectified and passed through a conventional filter network indicated generally at 93. D.C. signals corresponding to the 400 cycle calibration signals appearing across resistor 68 are thus passed through signal connector 70, through the cable conductor 15 and through the filter 75 to the recording galvanometer 74 whereupon the variable resistor 76 may be adjusted to provide a galvanometer deflection which accurately corresponds to the known magnitude of the calibration signal.

With the stepping switch in the "calibrate" position, a calibrating signal of known amplitude, for example, a signal having an amplitude one-tenth that of the calibrating signal supplied to the amplifier and rectifier circuit 38, is also applied to the input of the amplifier and rectifier circuit 35. More specifically, a calibrating signal derived from the secondary of transformer 84 is applied through a voltage divider network and through signal connectors 86 and 87 to a push-pull amplifier 95 of conventional construction in order to develop A.C. signals which are passed through output transformer 96 to the other half of the rectifier tube 92. Thus, the signals appearing across the secondary of transformer 96 are half wave rectified and then are passed through a conventional filter 97 in order to produce D.C. signals for transmission to the surface equipment via conductor 16. With the manually operated switch 44 in its "operating" position, the movable blade of switch section 45 is connected to its left contact as viewed in FIG. 2 and the cable conductor 16 thus supplies D.C. signals through a T-section filter 98 to a recording galvanometer 99 of the measuring device 36. The latter galvanometer is, therefore, supplied with an input signal of known magnitude and its deflection may be adjusted by varying potentiometer 100 shunted thereacross.

With the downhole stepping switch 77 in its third or "operating" position, that is, with the movable arms or blades of the switch sections in engagement with the contacts identified by reference numerals suffixed by the letter "c," the remote or reference electrode 37 is connected to one side of the primary of transformer 84 through switch section 80 while the electrically joined screen electrodes 22 and 23 are connected to the other side of this primary through switch section 79 and through condenser 82. The latter condenser, of course, prevents natural earth potentials present at the electrodes 21 and 37 from affecting the A.C. signal supplied to the transformer 84. The amplifier and rectifier circuit 38 is thus supplied with the A.C. difference of potential existing between the electrodes 22 and 23 and the remote or reference electrode 37 and, as previously indicated, this signal is converted to a D.C. signal which is passed through conductor 15 and is recorded by the measuring device 40 of the surface equipment. At the same time, the connectors 86 and 87 and their associated voltage divider network apply to the stage 95 a resistivity signal having an amplitude one-tenth that of the input signal applied to the stage 90. The signal applied to stage 95 is amplified, rectified and passed through filter 97 over cable conductor 16, and through filter 98 to the recording galvanometer 99 so that the curve developed by the latter may be used in the manner indicated above to determine the relatively high resistivities which fall beyond the linear range of amplification of the circuit 38.

Moreover, with the stepping switch 77 in the "operate" position, the self potential electrode 41 is connected through switch section 78 and through a T-section filter 101 to cable conductor 17. The filter 101, of course, prevents any A.C. signals from reaching conductor 17 and thus, insures that only the D.C. natural earth potential signals will be passed to the measuring circuit 42 at the surface. Conductor 17 at the earth's surface is connected through a second T-section filter 102 to a recording galvanometer 103 having its other side connected to a ground electrode as indicated at 104. An adjusting potentiometer 105 is connected in parallel with the galvanometer 103 for the purpose of adjusting or calibrating the measuring device 42. The D.C. signals supplied to the galvanometer 103 are recorded simultaneously with the resistivity signals supplied to the galvanometer 74, thereby to produce upon the record medium a second log or curve which exhibits the self potential signals as a function of borehole depth in side by side relationship with the apparent resistivity log produced by galvanometer 74.

The switch 77 as previously mentioned, is adapted to be actuated from the switch network 25 of the surface equipment. Thus, when it is desired to advance the stepping switch 77, the manually operated switch 44 is moved to its switching position; that is, with the movable blades of sections 43 and 45 in respective engagement with the contacts shown on the right in FIG. 2. With the switch 44 in its switching position the opposed poles of battery 106 are connected to conductors 15 and 16. The D.C. potential of the battery is thus applied across a series circuit consisting of resistors 107 and 108 and the operating coil of a D.C. operated relay 109 in the downhole equipment. When energized with the described D.C. potential, relay 109 is, of course, actuated to close its contact 110 in order to complete a circuit to the operating coil 111 of the stepping switch 77. It will be understood, of course, that the D.C. signals existing upon cables 15 and 16 when the manually operated switch 44 is in its operating position are of insufficient amplitude of energize the relay 109. When the contact 110 is closed the operating coil 111 is connected directly across conductors 15 and 16 and, hence, is supplied with current from the battery 106 with the result that the stepping switch 77 is advanced one step. The described advancement is accomplished by moving a solenoid armature 112 to rotate through an angle of 120° a ratchet 113 having three spaced teeth on its peripheral surface. The ratchet 113 is fixedly mounted upon a shaft indicated at 114 which also carries the blades of the various sections of the switch 77. Thus, each time the manually operated switch 44 is moved from the "operating" to the "switch" position, the stepping switch 77 is advanced one step.

As previously indicated, in order to focus the current from the measuring electrode 21 in a horizontal direction that is, to force this current to flow in a thin sheet or disk extending from the electrode 21 in a direction perpendicular to the borehole 10, the screen electrodes 22 and 23 must be maintained at substantially the same electrical potential as the measuring electrode. As previously indicated, this is accomplished by measuring or sampling the potential difference existing in the vicinity of the current electrode and by employing the output of this sampling means to control the supply of current to the screen electrodes. In the embodiment illustrated in FIG. 2 this sampling is effected by a transformer 32 having its primary connected to bridge the gap existing between electrode 21 and the electrically interconnected screen electrodes 22 and 23. The elongated guard electrodes 22 and 23 may, of course, be replaced by point electrodes as employed in certain prior art systems and, in this case, the described sampling would be effected by measuring the potential difference existing between electrodes spaced from and located between the measuring electrode and the guard electrode. Thus, in the appended claims the term "means for sampling the potential difference existing in the vicinity of the measuring electrode" is intended to encompass both the latter type sampling and the sampling means illustrated in FIG. 2 wherein a sample is made of the potential difference existing between the electrode 21 and the screen electrodes. In any event, in the arrangement illustrated in FIG. 2, the signals appearing across the secondary of the transformer 32 are transformer coupled to the input of the preamplifier 33. Specifically, the secondary of the transformer 32 is connected directly across the primary winding of a transformer 120 the secondary of which is adapted to supply input signals across the grid and cathode of one section of a two stage amplifier tube 121. The output stage of the preamplifier 33 is coupled through a transformer 122 to the input of the phase sensitive network 65 which, as was mentioned previously, also receives a reference signal from transformer 119 having a frequency and phase corresponding to the measuring signal from electrode 21. The relatively small A.C. signal supplied to the symmetry points of the network 65 via transformer 122 represents the voltage from the sensing transformer 32 caused by unbalance or change in the difference of potential existing between the current electrode 21 and the interconnected screen electrodes 22 and 23. The phase sensitive network 65 compares the two voltages supplied from transformers 119 and 122 and develops a signal for controlling the gain of the current control circuit 34 in accordance with the phase relationship existing between the two input signals. More specifically, if the potential of the measuring electrode 21 is higher than that of the screen electrodes, the two signals supplied to the network 65 will be in phase and, if the potential of the screen electrodes exceeds that of the measuring electrode the two signals will be 180° out of phase. The two signals supplied to the phase sensitive network are superposed and are rectified by a pair of diodes 123 and 124 to develop a D.C. output signal across the opposed ends of balancing potentiometer 125. The magnitude of this D.C. output signal depends upon the unbalance between the measuring electrode 21 and the screen electrodes 22 and 23 as well as the amplification factor or gain of the preamplifier 33. Since the signal supplied from transformer 119 is of constant amplitude it does not affect the magnitude of the D.C. output signal appearing across potentiometer 125. However, the polarity of the D.C. output signal, as indicated above, is a function of the phase relationship existing between the measuring current signal supplied by transformer 119 and the difference of potential signal supplied by transformer 122. The described D.C. control signal is applied to the control grid of a remote cutoff pentode amplifier tube 126 in order to control its gain. The current control circuit 34 includes, in addition to the pentode amplifier stage 126, a phase inverting triode stage 127, a second remote cutoff pentode stage 128 and a pair of power pentodes 130 and 131 connected in a push-pull arrangement to develop output signals across a transformer 132. One end of the secondary winding of transformer 132 is grounded while the other end is connected to the screen electrodes 22 and 23 by conductor 133. The current flow through the conductor 133 is adapted to maintain the screen electrodes 22 and 23 at essentially the same potential as the measuring electrode 21 in order to provide the above described focusing of the measuring current. The difference of potential existing between electrode 21 and the screen electrodes 22 and 23 is held to a minimum and its exact value is a function of the amplification provided by the current control circuit 34.

To effect the above described regulation of the screen potential, the stage 126 is supplied with constant amplitude A.C. signals from the transformer 116 and the D.C. signal developed by the phase sensitive network 65 is employed to vary the gain of the stage 126. Thus, as long as the difference of potential applied across the input of transformer 32 remains constant and nearly at zero the amplification factor of the current control circuit 34 remains at a predetermined level, while any change in this difference of potential alters the bias on the stage 126 in a proper direction and magnitude to drive the screen electrodes through the output from transformer 132 and conductor 133 until the balanced condition is restored.

In view of the foregoing description, it will be recognized that when the formations being measured are of low resistance and when a high counter coupling or feedback voltage is developed across the primary of transformer 32 as a result of the current flow from the screen electrodes to the measuring electrode through the formation resistance, the phase sensitive network 65 develops a D.C. signal to reduce the gain of the current control circuit 34, thereby avoiding the possibility of driving the amplifiers into oscillation. Conversely, when the earth formation resistances are high the gain of the current control circuit 34 is increased accordingly by the signal developed by the phase sensitive network. Thus, the present invention provides a fully electronic regulator which responds practically instantaneously to changes in formation resistance and, hence, results in the production of resistivity curves showing far more accurate and detailed information than has been derived from the arrangements heretofore employed.

In view of the foregoing description, it will be recognized that the apparatus of the present invention is operated by first lowering the downhole equipment 12 to any desired depth in the borehole. This is done with the stepping switch 77 in its "off" position so that no signals are supplied through the cable 13 to the surface equipment 20. When the downhole equipment 12 has reached the desired depth the manually operated switch 44 may be temporarily placed in its "switch" position in order to advance the stepping switch one step from the "off" to the "calibrate" position at which time the measuring circuits of the surface equipment may be calibrated in the manner described above. After the calibration has been completed the manually operated switch 44 is again momentarily placed in its "switch" position in order to advance the stepping switch from the "calibrate" to the "operate" position. When the stepping switch has been moved to the operate position the manually operated switch 44 is, of course, returned to its "operating" position and the downhole equipment 12 is then moved through the borehole 10 at any desired rate. At the same time the medium upon which the logging signals are to be recorded is moved past the recording galvanometers 74, 99 and 103 at a rate corresponding to the rate of movement of the downhole equipment 12. The resistivity signals appearing upon conductor 15, the resistivity signals appearing upon conductor 16 and the self potential signal appearing upon conductor 17 are, of course, continuously recorded upon the moving record medium, thereby to provide three side by side traces or curves which may be used to determine the nature, extent and location of the various subsurface strata penetrated by the borehole 10.

It should also be observed that the electronic regulator of the present invention may be used in so called "Micrologging" or "Micro-focusing" arrangements where a single guard ring encircling an inner current electrode is employed to focus the measuring current. In such systems the input to the preamplifier 33 would be derived from a current transformer 32 having its primary winding connected across the guard ring and the current electrode while the input to the transformers 117 and 119 would again be derived from the current flow to the center or measuring electrode.

While a particular embodiment of the invention has been shown and described, it will be recognized that various modifications will readily occur to those skilled in this art and it is, therefore, intended by the appended claims to cover any such modifications as fall within the true spirit and scope of the present invention.

What is claimed as new and desired to be secured by Letters Patent of the United States is:

1. In an electrical system for logging the earth formations adjacent a borehole, the combination of a current electrode adjacent the earth formations; a circuit for passing a substantially constant alternating current from said current electrode through the formations; at least two screen electrodes electrically connected together and symmetrically disposed above and below said current electrode; an electronic regulator for supplying current to said screen electrodes tending to maintain the difference of potential between said current electrode and said screen electrodes constant and substantially zero; a transformer having a primary winding connected between said current electrode and said screen electrodes and having a secondary winding connected to supply alternating current signals to said electronic regulator corresponding to said difference of potential, said electronic regulator including a preamplifier for amplifying the signals from said transformer, a phase sensitive network supplied with input signals from said preamplifier and also supplied with reference signals from said circuit for developing D.C. control signals having a polarity corresponding to the direction of deviation of the phase of said input signals from said reference signals and having a magnitude corresponding to the amount of such deviation, and a variable gain amplifier arrangement having a gain control circuit varied by said D.C. control signals in order to control the amount of current supplied to said screen electrodes from said electronic regulator; a first measuring circuit for measuring the potential difference between said current electrode and a remote reference point to provide first measurements of the resistivities of the earth formations adjacent the current electrode; a second measuring circuit for measuring only a portion of the last mentioned potential difference in order to provide, simultaneously with the first measurements, second resistivity measurements accurate within a different range than the range of accuracy of the first measuring circuit; and means for simultaneously recording said first and second measurements as a function of borehole depth, whereby said first and second measurements are available for comparison so that the measurement within the most accurate range of formation resistivities at each borehole depth can be used.

2. In an electrical system for logging the earth formations adjacent a borehole, the combination of a current electrode adjacent the earth formations; a circuit for passing a substantially constant alternating current from said current electrode through the formations; a plurality of screen electrodes symmetrically disposed above and below said current electrode; an electronic regulator for supplying current to said screen electrodes tending to maintain the difference of potential between said current electrode and said screen electrodes constant and substantially zero; means for sampling a difference of potential in the vicinity of said current electrode and for supplying alternating current signals corresponding to the sampled difference of potential to said electronic regulator, said electronic regulator including a preamplifier for amplifying the signals from the sampling means, a phase sensitive network supplied with input signals from said preamplifier and also supplied with reference signals from said circuit for developing D.C. control signals having a polarity corresponding to the direction of deviation of said input signals from said reference signals and having a magnitude corresponding to the amount of such deviation, and a variable gain amplifier arrangement having a gain control circuit varied by said D.C. control signals in order to control the amount of current supplied to said screen electrodes from said electronic regulator; a first measuring circuit for measuring the potential difference between said current electrode and a remote reference point to provide first measurements of the resistivities of the earth formations adjacent the current electrode; a second measuring circuit for measuring only a portion of the last mentioned potential difference in order to provide, simultaneously with the first measurements, second resistivity measurements accurate within a different range than the range of accuracy of the first measuring circuit; and means for simultaneously recording said first and second measurements as a function of borehole depth, whereby said first and second measurements are available for comparison so that the measurement within the most accurate range of formation resistivities at each bore hole depth can be used.

3. In an electrical system for logging the earth formations adjacent a borehole, the combination of a current electrode adjacent the earth formations; a circuit for passing a substantially constant alternating current from said current electrode through the formations; a plurality of screen electrodes symmetrically disposed above and below said current electrode; an electronic regulator for supplying current to said screen electrodes tending to maintain the difference of potential between said current electrode and said screen electrodes constant and substantially zero; means for sampling any difference of potential existing in the vicinity of said current electrode and for supplying alternating current signals to said electronic regulator corresponding to the sampled difference of potential, said electronic regulator including a phase sensitive network supplied with said alternating current signals and also supplied with reference signals from said circuit for developing D.C. control signals having a polarity corresponding to the direction of deviation of said alternating current signals from said reference signals and having a magnitude corresponding to the amount of such deviation, and a variable gain amplifier arrangement having a gain control circuit varied by said D.C. control signals in order to control the amount of current supplied to said screen electrodes from said electronic regulator; a first measuring circuit for measuring the potential difference between said current electrode and a remote reference point to provide first measurements of the resistivities of the earth formations adjacent the current electrode; a second measuring circuit for measuring only a portion of the last mentioned potential difference in order to provide, simultaneously with the first measurements, second resistivity measurements accurate within a different range than the range of accuracy of the first measuring circuit; and means for simultaneously recording said first and second measurements as a function of borehole depth, whereby said first and second measurements are available for comparison so that the measurement within the most accurate range of formation resistivities at each borehole depth can be used.

4. In an electrical system for logging the earth formations adjacent a borehole, the combination of a current electrode adjacent the earth formations; a circuit for passing a substantially constant alternating current from said current electrode through the formations; at least two screen electrodes electrically connected together and symmetrically disposed above and below said current electrode; an electronic regulator for supplying current to said screen electrodes tending to maintain the difference of potential between said current electrode and said screen electrodes constant and substantially zero; a transformer havng a primary winding connected between said current electrode and said screen electrodes and having a secondary winding connected to supply alternating current signals to said electronic regulator corresponding to said difference of potential, said electronic regulator including a phase sensitive network supplied with said alternating current signals and also supplied with reference signals from said circuit for developing a D.C. control signal, and a variable gain amplifier arrangement having a gain control circuit varied by said D.C. control signal in order to control the amount of current supplied to said screen electrodes from said electronic regulator; a first measuring circuit for measuring the potential difference between said current electrode and a remote reference point to provide first measurements of the resistivities of the earth formations adjacent the current electrode; a second measuring circuit for measuring only a portion of the last mentioned potential difference in order to provide, simultaneously with the first measurements, second resistivity measurements accurate within a different range than the range of accuracy of the first measuring circuit; and means for simultaneously recording said first and second measurements as a function of borehole depth, whereby said first and second measurements are available for comparison so that the measurement within the most accurate range of formation resistivities at each borehole depth can be used.

5. In an electrical system for logging the earth formations adjacent a borehole, the combination of a current electrode adjacent the earth formations; a circuit for passing a substantially constant alternating current from said current electrode through the formations; a plurality of screen electrodes symmetrically disposed above and below said current electrode; an electronic regulator for supplying current to said screen electrodes tending to maintain the difference of potential between said current electrode and said screen electrodes constant and substantially zero; means for sampling any difference of potential existing in the vicinity of said current electrode and for supplying alternating current signals to said electronic regulator corresponding to the sampled difference of potential, said electronic regulator including a phase sensitive network supplied with said alternating current signals for developing D.C. control signals, and a variable gain amplifier arrangement having a gain control circuit varied by said D.C. control signals in order to control the amount of current supplied to said screen electrodes from said electronic regulator; a first measuring circuit for measuring the potential difference between said current electrode and a remote reference point to provide first measurements of the resistivities of the earth formations adjacent the current electrode; a second measuring circuit for measuring only a portion of the last mentioned potential difference in order to provide, simultaneously with the first measurements, second resistivity measurements accurate within a different range than the range of accuracy of the first measuring circuit; and means for simultaneously recording said first and second measurements as a function of borehole depth, whereby said first and second measurements are available for comparison so that the measurement within the most accurate range of formation resistivities at each borehole depth can be used.

6. In an electrical well logging system the combination of an array of electrodes movable in unison through a borehole and including a current emitting electrode and a pair of electrically joined, elongated guard electrodes respectively disposed above and below the current emitting electrode, means for passing a survey current of constant amplitude from the current emitting electrode through earth formations adjacent the borehole, means for supplying to the guard electrodes an auxiliary current of such value as to maintain substantially zero the potential difference between these electrodes and the current emitting electrode, the last named means including a variable gain amplifier, the gain of which is varied to control the level of the auxiliary current, means for supplying to the inlet of said amplifier constant level input signals derived from the flow of survey current, a circuit jointly responsive to said potential difference and to said survey current for developing a control signal for controlling the gain of the variable gain amplifier to alter the auxiliary current flow in such direction as to drive any potential difference towards zero, a first measuring circuit for measuring directly the difference of potential between the current emitting electrode and a remote reference point in order to provide a direct indication of the resistivity of the formations, a second measuring circuit responsive to only a portion of the last mentioned difference of potential for providing, simultaneously with the first measurement, second resistivity measurements accurate within a range different from the range of accuracy of the measurements provided by the first measuring circuit, and means for simultaneously recording said first and second measurements as a function of borehole depth, whereby said first and second measurements are available for comparison so that the measurement within the most accurate range of formation resistivities at each borehole depth can be used.

7. The well logging system defined in claim 6 wherein the control signal is a unidirectional signal having an amplitude which is a function of the magnitude of the potential difference between the current emitting electrode and the guard electrodes and having a polarity which is a function of the relative potentials of the current emitting electrode and the guard electrodes.

8. The well logging system defined in claim 7 wherein said circuit includes a phase sensitive rectifier excited by input signals developed in response to any potential difference existing between the guard electrodes and the current emitting electrode and also excited by reference signals derived from said survey current, said rectifier being effective to develop D.C. control signals having a polarity dependent upon the relative potentials of the guard electrodes and the current emitting electrode and having an amplitude corresponding to the magnitude of any potential difference therebetween.

9. The well logging system defined by claim 8 wherein the input signals to the rectifier are developed by a transformer having its primary winding connected across the guard electrodes and the current emitting electrode and having its secondary winding connected to supply signals to a preamplifier.

10. In an electrical well logging system the combination of an array of electrodes movable in unison through a borehole and including a current emitting electrode and a pair of electrically joined guard electrodes respectively disposed above and below the current emitting electrode, means for passing a survey current of constant amplitude from the current emitting electrode through earth formations adjacent the borehole, means for supplying to the guard electrodes an auxiliary current of such value as to maintain substantially zero the potential difference between these electrodes and the current emitting electrode, the last named means including a variable gain amplifier, the gain of which is varied to control the level of the auxiliary current, means for supplying to the inlet of said amplifier constant level input signals derived from the flow of survey current, means for sampling a difference of potential in the vicinity of the current electrode, a circuit jointly responsive to signals from the sampling means and to signals derived from said survey current for developing a control signal for controlling the gain of the variable gain amplifier to alter the auxiliary current flow in such direction as to drive any potential difference detected by the sampling means towards zero, a first measuring circuit for measuring directly the difference of potential between the current emitting electrode and a remote reference point in order to provide a direct indication of the resistivity of the formations, a second measuring circuit responsive to only a portion of the last mentioned difference of potential for providing, simultaneously with the first measurement, second resistivity measurements accurate within a range different from the range of accuracy of the measurements provided by the first measuring circuit, and means for simultaneously recording said first and second measurements as a function of borehole depth, whereby said first and second measurements are available for comparison so that the measurement within the most accurate range of formation resistivities at each borehole depth can be used.

11. The system defined by claim 1 wherein the variable gain amplifier is supplied with constant amplitude input signals derived from the circuit for passing the constant current to the current electrode.

12. The system defined by claim 3 wherein the variable gain amplifier is supplied with constant amplitude input signals derived from the circuit for passing the constant current to the current electrode.

13. The system defined by claim 5 wherein the variable gain amplifier is supplied with constant amplitude input signals derived from the circuit for passing the constant current to the current electrode.

References Cited in the file of this patent
UNITED STATES PATENTS

| | | |
|---|---|---|
| 2,046,436 | Wascheck | July 7, 1936 |
| 2,250,024 | Jakosky | July 22, 1941 |
| 2,707,768 | Owen | May 3, 1955 |
| 2,803,796 | Schuster | Aug. 20, 1957 |
| 2,879,468 | Lamb | Mar. 24, 1959 |
| 2,884,590 | Welz | Apr. 28, 1959 |
| 2,885,632 | Schuster | May 5, 1959 |
| 2,933,674 | Schuster | Apr. 19, 1960 |